(12) United States Patent
Fricke et al.

(10) Patent No.: US 6,730,915 B2
(45) Date of Patent: May 4, 2004

(54) POSITION SENSOR FOR ULTRAVIOLET AND DEEP ULTRAVIOLET BEAMS

(75) Inventors: William C. Fricke, New Fairfield, CT (US); Michael Ganopoulos, Vanburg, CT (US)

(73) Assignee: Star Tech Instruments, Inc., Danbury, CT (US)

( * ) Notice: Subject to any disclaimer, the term of this patent is extended or adjusted under 35 U.S.C. 154(b) by 144 days.

(21) Appl. No.: 10/123,491

(22) Filed: Apr. 15, 2002

(65) Prior Publication Data

US 2003/0193030 A1 Oct. 16, 2003

(51) Int. Cl.[7] ................................................. G01J 1/58
(52) U.S. Cl. ................. 250/372; 250/484.2; 250/474.1; 359/328
(58) Field of Search ............................. 250/372, 484.2, 250/484.4, 472.1, 483.1, 474.1, 462.1, 909, 328, 584

(56) References Cited

U.S. PATENT DOCUMENTS

| | | | |
|---|---|---|---|
| 4,731,881 A | 3/1988 | Geller | |
| 4,885,471 A | 12/1989 | Telfair et al. | |
| 5,026,996 A | 6/1991 | Fricke | |
| 5,631,767 A | * | 5/1997 | Dodge et al. ............... 359/328 |
| 6,255,619 B1 | * | 7/2001 | Jitsuno et al. ......... 219/121.62 |
| 6,340,820 B1 | * | 1/2002 | Youden et al. ........... 250/484.4 |

FOREIGN PATENT DOCUMENTS

| | | | | |
|---|---|---|---|---|
| JP | 6-5237 A | * | 1/1994 | ............ H01J/37/04 |
| JP | 11-125702 A | * | 5/1999 | ............ G02B/3/00 |

* cited by examiner

*Primary Examiner*—Constantine Hannaher
*Assistant Examiner*—Otilia Gabor
(74) *Attorney, Agent, or Firm*—Bachman & LaPointe

(57) ABSTRACT

A position sensor for ultraviolet beams includes a beam positioning member for directing an ultraviolet beam along a path; a downconverter member for converting the beam to visible light; a position sensing member for sensing position of visible light thereon; and relay optics for directing the visible light to the position sensing member; wherein the position sensing member is communicated with the beam positioning member for conveying information regarding position of the visible light to the beam positioning member.

3 Claims, 1 Drawing Sheet

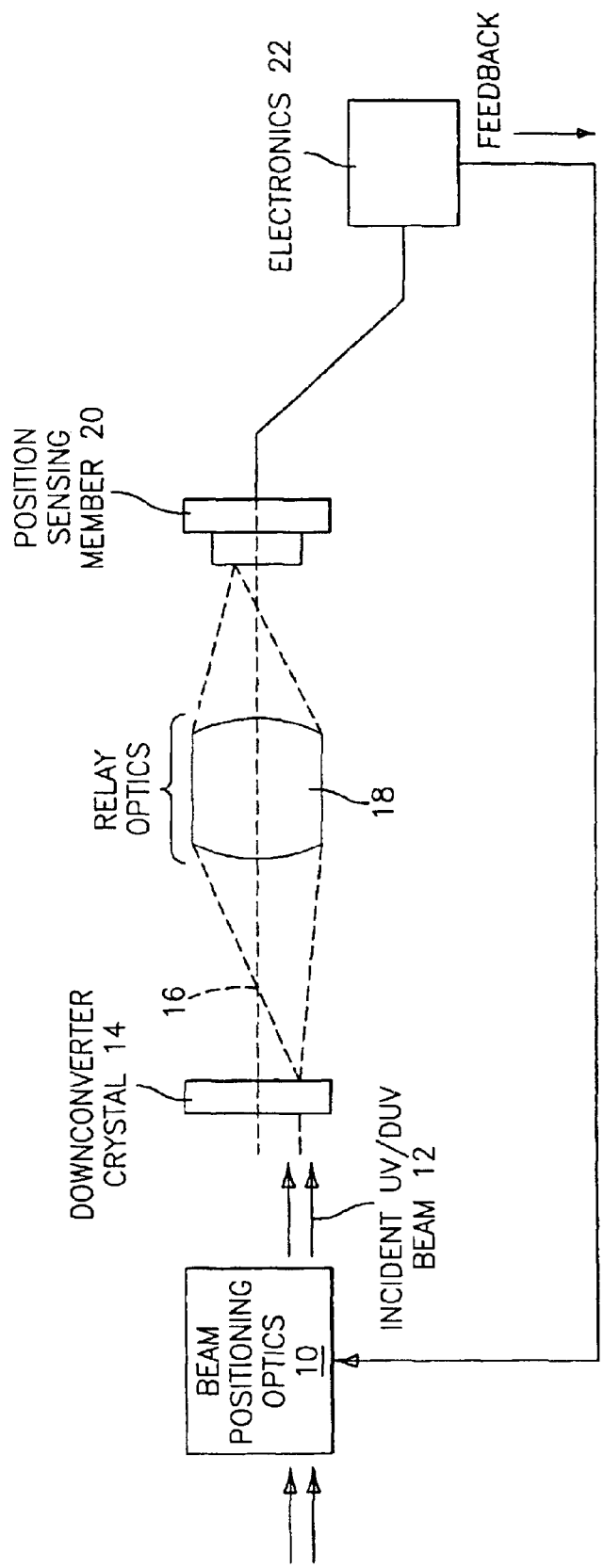

POSITION SENSOR FOR ULTRAVIOLET AND DEEP ULTRAVIOLET BEAMS

BACKGROUND OF THE INVENTION

The invention relates to a beam position sensing apparatus for sensing position of ultraviolet (UV, DUV, EUV) beams.

Numerous medical, industrial and other processes rely on proper positioning of beams such as ultraviolet and deep ultraviolet beams and the like. Accurate positioning of the beams in such processes is critical.

Position sensing members such as quad cells, lateral effect detectors and the like are known. However, long-term exposure of such position sensing members to UV, DUV and EUV radiation results in rapid and serious degradation of performance of the position sensing member.

It is clear that the need remains for an apparatus for sensing position of ultraviolet, deep ultraviolet and the like beams wherein performance does not rapidly decline.

It is therefore the object of the present invention to provide such an apparatus.

Other objects and advantages of the present invention will appear hereinbelow.

SUMMARY OF THE INVENTION

In accordance with the present invention, the foregoing objects and advantages have been readily attained.

According to the invention, a position sensor for ultraviolet beams is provided, which comprises a beam positioning member for directing an ultraviolet beam along a path; a downconverter member for converting the beam to visible light; and a position sensing member for sensing position of the visible light thereon; and relay optics for directing the visible light to the position sensing member; wherein the position sensing member is communicated with the beam positioning member for conveying information regarding position of the visible light to the beam positioning member.

BRIEF DESCRIPTION OF THE DRAWINGS

A detailed description of preferred embodiments of the present invention follows, with reference to the attached drawing, which schematically illustrates an apparatus in accordance with the present invention.

DETAILED DESCRIPTION

The invention relates to a position sensor for ultraviolet, deep ultraviolet and EUV (collectively referred to hereinafter as ultraviolet) beams, which accurately and reliably produces position information of the beam without performance degradation due to long-term exposure to UV/DUV/EUV radiation. The term "beam" hereinafter refers to any ultraviolet source.

In accordance with the present invention, the ultraviolet, deep ultraviolet and EUV beam is downconverted to longer wavelength radiation (visible, near—IR, etc., hereinafter collectively referred to as visible light) and relayed to a position sensor which is programmed to detect appropriate position of the beam and convey this information back to beam positioning optics for positioning the ultraviolet beam. In this manner, the position sensing member is not exposed to directly incident ultraviolet beams, and is therefore protected from same.

Referring to the drawing, the apparatus in accordance with the present invention is schematically illustrated.

According to the invention, a beam positioning member or beam position optics 10 are provided for directing an ultraviolet beam 12 as desired. Optics 10 direct beam 12 along a path and to a downconverter crystal or member 14 which advantageously converts the ultraviolet beam to visible light 16 which is advantageously conveyed through relay optics 18 to focus on a point of a position sensing member 20 such as a quad cell, lateral effect position sensing detector and the like. Position sensing member 20 is advantageously communicated, through suitable electronics 22, so as to provide information or feedback as to beam position to beam positioning member 10 as desired.

It should be noted that beam positioning optics 10, downconverter crystal 14, relay optics 18 and position sensing member 20 are all devices which themselves are well known to a person of ordinary skill in the art. Thus, further disclosure in connection with each of these individual components is not presented herein.

As should be readily appreciated from a further consideration of the figure, the apparatus in accordance with the present invention advantageously avoids direct incidence of UV beam 12 on position sensing member 20, which, as set forth above, would rapidly destroy position sensing member 20. Rather, UV beam 12 is advantageously converted to visible light and focused onto position sensing member 20 such that the position of the visible light on position sensing member 20 can be detected, and correlated to the position of UV beam 12, so as to advantageously provide accurate, and long-term reliable, information regarding position of UV beam 12.

This apparatus can advantageously be used in numerous industrial, medical and like procedures wherein the accurate positioning of UV and like beams is critical.

In further accordance with the present invention, position sensing member 20 may advantageously be a quad cell as illustrated in the figure, which can accurately convey information regarding position of the beam back to optics 10 as desired.

In accordance with an alternate and preferred embodiment of the present invention, position sensing member 20 can be provided as a lateral effect position sensing detector, which can produce the actual x, y coordinates of a centroid of the visible light beam directed thereon. Using this type of position sensing member 20, in addition to controlling the beam position through the feedback loop as illustrated in the drawing, the apparatus in accordance with the present invention can also provide position data for beam wander statistical analysis or tracking and the like.

Specific examples of various applications wherein the apparatus of the present invention can find useful application include positioning of beams on wafers during microlithography, laser surgery, machining using ultraviolet beams, and the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A position sensor for ultraviolet beams, comprising:
a beam positioning member for directing an ultraviolet beam along a path;

a downconverter member for converting the beam to visible light;

a position sensing member for sensing position of visible light thereon; and relay optics for directing the visible light to the position sensing member;

wherein the position sensing member is communicated with the beam positioning member for conveying information regarding position of the visible light to the beam positioning member.

2. The position sensor of claim 1, wherein the position sensing member is a quad cell.

3. The position sensor of claim 1, wherein the position sensing member is a lateral effect position sensing detector adapted to produce x, y coordinates of the visible light.

* * * * *